United States Patent [19]

Cain et al.

[11] 4,453,853
[45] Jun. 12, 1984

[54] DIFFERENTIAL EXPANSION CONTRACTION STRUCTURAL INTERCONNECTION SYSTEM

[75] Inventors: Earl S. Cain, Portola Valley; Jerome A. Carlson, Woodside, both of Calif.

[73] Assignee: Tribotech, Redwood City, Calif.

[21] Appl. No.: 325,573

[22] Filed: Nov. 27, 1981

[51] Int. Cl.³ .......................... F16C 9/00; F16D 1/00; F16G 11/00
[52] U.S. Cl. ..................................... 403/28; 403/404; 74/446
[58] Field of Search ...................... 403/28, 29, 30, 273, 403/404; 74/446, 447; 256/19, 65, 73

[56] References Cited

U.S. PATENT DOCUMENTS

| | | | |
|---|---|---|---|
| 2,443,688 | 6/1948 | McFarland | 403/29 |
| 2,999,396 | 9/1961 | Kaczmarski | 74/447 X |
| 3,481,636 | 12/1969 | Frank et al. | 403/358 X |
| 3,805,552 | 4/1974 | Heald | 74/446 X |
| 4,027,855 | 6/1977 | Lauzier | 256/65 X |
| 4,074,946 | 2/1978 | Swearingen | 403/364 |

Primary Examiner—Richard J. Scanlan, Jr.
Attorney, Agent, or Firm—Flehr, Hohbach, Test, Albritton & Herbert

[57] ABSTRACT

A thermally compliant structural interconnection of a support structure and working material components provided by surfaces of the working material components being engaged by surfaces of the support structure. Dissimilar materials or components that are at different temperatures may be interconnected by support structure projections engaging recesses in the components. By providing the recesses in at least two axially displaced rows, the projections expansion or contraction relative to the recesses is compensated for thereby maintaining the projections in engagement with the surfaces of the recesses. Accordingly, relative displacements of the members axes are minimized and distortions circumvented.

10 Claims, 5 Drawing Figures

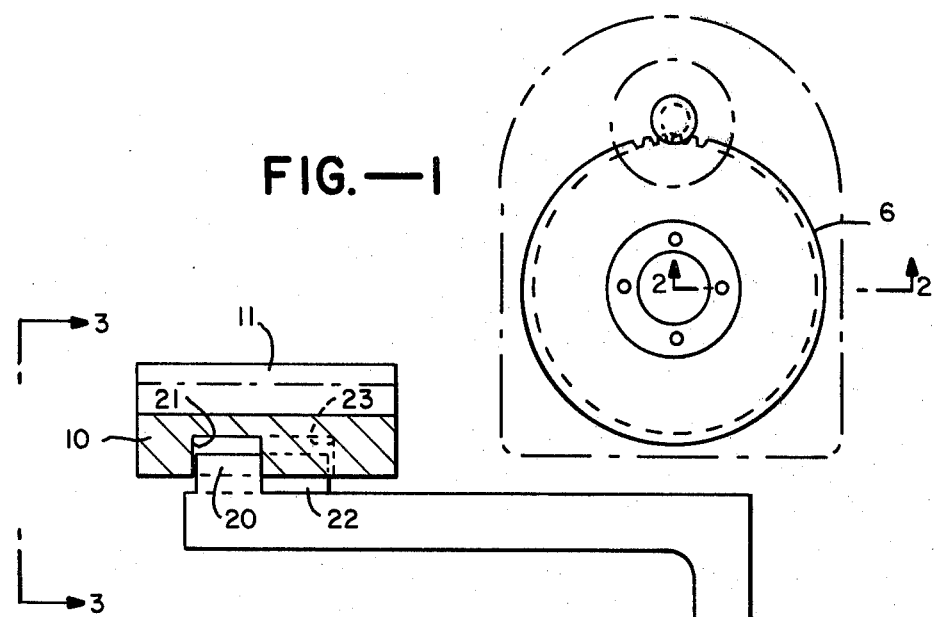
FIG.—1
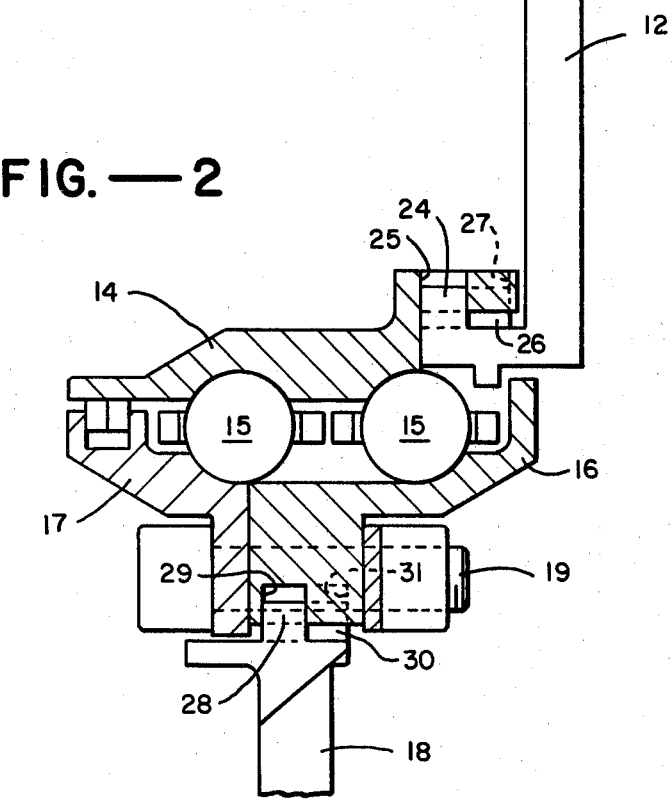
FIG.—2

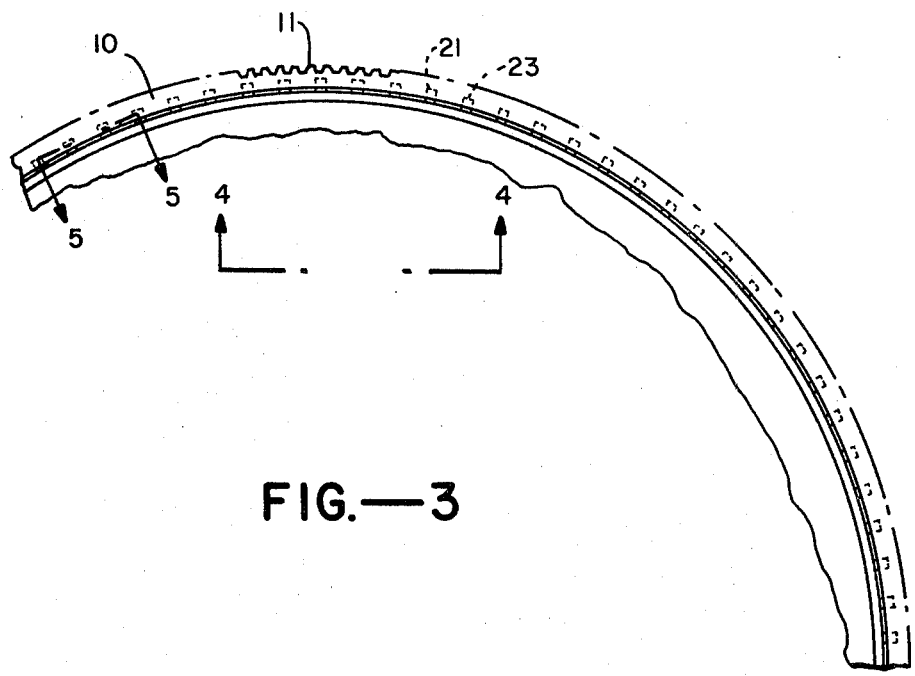
FIG.—3
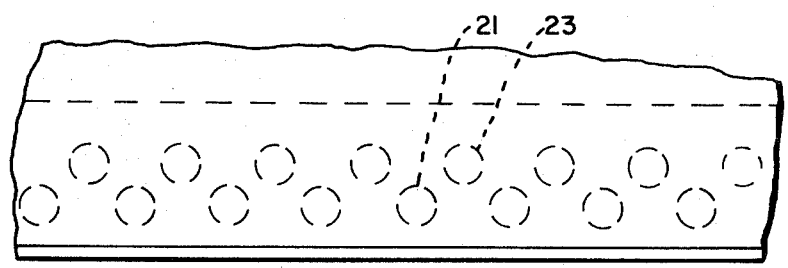
FIG.—4
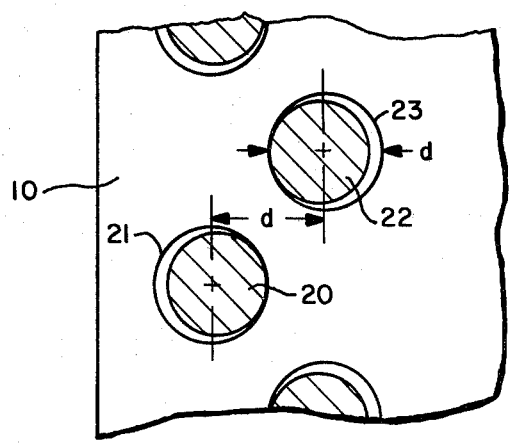
FIG.—5

DIFFERENTIAL EXPANSION CONTRACTION STRUCTURAL INTERCONNECTION SYSTEM

This invention relates generally to structures that consist of interconnected components made of materials having different coefficients of expansion or that are at different temperatures, and more particularly the invention relates to such assemblies which utilize precision geometry parts with a support structure such that distortion and axes displacement must be minimized.

Potential usage areas of the invention are electro-optical lenses and/or windows with their associated structures, parabolic antennas, turbine engine structural supports, rocket nozzle structures, and the like. Relevant typical aircraft and industrial material combinations of working component and support are steel and aluminum, glass or refractory and copper alloy, chrome nickel alloy and beryllium or titanium, or metal and plastic or composite.

One specific area is the use of lightweight but wear resistant bearing and gear assemblies required in rotatably mounting electronic apparatus such as radar antennae or optical tracking apparatus in an airborne fuselage. Advantageously, such an assembly will combine the wear resistance of steel gears and bearing races with the light weight of aluminum. In a bearing-gear assembly the aluminum support structure may be cooperatively formed by pouring molten aluminum to interconnect, upon cooling, the steel gear and race portions by a suitable mold in which the molten aluminum is poured.

A difficulty in such an assembly is providing a thermally compliant joint between the aluminum and the steel parts because of the difference in the coefficients of thermal expansion of the two metals. As the aluminum cools some radial, axial, and circumferential interference or looseness can develop between the metal parts. Heretofore, separate members have been required for retention and/or clamping of the components to maintain a unitary functional assembly.

An object of the invention is an improved method of forming an expansion or contraction joint between parts made of materials having different coefficients of thermal expansion or which coexist at different temperatures.

Briefly, in accordance with one embodiment of the invention a bearing-gear assembly has a wear resistant part of a first metal which is joined to a support part of a second metal by means of spaced spokes of the second metal engaging recesses in the first metal. More particularly, the second metal is cast from the liquid phase to form spokes within the recesses of the first metal.

In one embodiment, the spokes are arranged in two axially and angularly offset rows whereby alternative radial spokes contract axially toward one another more rapidly than the recesses in the first metal whereby the contraction of the staggered spokes towards each other compensates for the increasing clearance between each spoke and its mating recess as the spokes cool.

In a particular application a gear and bearing assembly made of wear resistant steel is supported by a cooperating aluminum assembly including a support ring which engages both the ring gear and the bearing race with spokes in accordance with the invention, and a mounting ring which engages the bearing race by means of a plurality of spokes. The spokes are cooperatively arranged whereby radial, axial, circumferential and rotational clearance or play between the component parts is minimized or eliminated.

The invention and objects and features thereof will be more readily apparent from the following detailed description and appended claims when taken with the drawing, in which:

FIG. 1 is a perspective view illustrating a gear and bearing assembly in accordance with one embodiment of the invention.

FIG. 2 is a section view of the assembly of FIG. 1 taken along the line 2—2.

FIG. 3 is a side view of the assembly of FIG. 2.

FIG. 4 is a view of the assembly of FIG. 3 taken along the line 4—4.

FIG. 5 is a section view of the assembly of FIG. 3 taken along the line 5—5.

Referring now to the drawings, FIG. 1 is a perspective view of a gear and bearing assembly in accordance with one embodiment of the invention. In a typical application the gear support ring 12 may be utilized to rotatably mount electronic or optical equipment in the fuselage of an aircraft, for example, in which the gear and bearing assembly must be lightweight yet have wear resistant parts. Thus, the bearing assembly preferably includes a steel gear and steel bearing races for durability and an aluminum support structure which is strong but lightweight. The mating and maintaining of a precision geometry aluminum support and precision geometry steel components presents problems of maintaining a thermally compliant joint between the parts. Heretofore separate members including locking devices and clamps have been used to maintain the components as a unitary functional assembly.

In accordance with the present invention the components of different materials are interlocked by providing a plurality of recesses in a surface of the steel components and casting the aluminum structure from the liquid phase in engagement with the steel components whereby the aluminum structure has a plurality of spokes which engage the recesses in the steel member. Because of the differences in coefficients of thermal expansion of aluminum and steel, as the aluminum cools the spokes shrink and an increasing clearance develops between each aluminum spoke and its mating steel recess. However, in accordance with one feature of the invention the recesses are arranged in at least two axially displaced rows whereby the spokes contract axially towards one another and thereby the staggered spokes maintain slidable but solid contact with the recesses despite the increasing clearance between each spoke and its mating recess.

FIG. 2 is a section view of the bearing gear assembly of FIG. 1 taken along the line 2—2. The gear 10 having outer gear teeth 11 is supported by an aluminum support ring 12, and the support ring 12 is in turn supported by a steel race 14 of the bearing assembly. A second steel race 16 of the bearing assembly is supported on an aluminum mounting ring 18 which in turn is fastened to the aircraft fuselage (not shown). A third bearing race 17 is fastened to the second race 16 by means of bolt 19. The steel bearing balls 15 are maintained within the races 14, 16, and 19.

As shown in FIG. 2 the aluminum components 12 and 18 have a plurality of radial spokes which engage two rows of recesses in the steel components 10, 14, and 16. For example, the spokes 20 and 22 engage recesses 21 and 23 in the inner circumferential surface of the gear 10 which are offset by one diameter as illustrated. Similarly, the spokes 24 and 26 of the support ring 12 engage offset recesses 25 and 27 of the steel race 14. Again, the recesses 25 and 27 are axially offset by one diameter. Similarly, the spokes 28 and 30 of the aluminum mounting ring 18 engage recesses 29 and 31 in the steel bearing race 16, which recesses are axially offset by one diameter.

FIG. 3 is a side view of the gear assembly of FIG. 2 taken along the line 3—3 and further illustrates the teeth 11 on the outer circumferential surface of the gear 10 and the plurality of recesses 21 and 23 in the inner curcumferential surface of the gear. Each of the recesses 21 is axially offset from the recesses 23 as shown in the internal section view of the gear 10 in FIG. 4 which is taken along the line 4—4 of FIG. 3.

FIG. 5 is a section view of the gear 10 taken along the line 5—5 of FIG. 3 and further illustrates the thermally compliant joint provided by the aluminum spokes 20 and 22 as the aluminum support ring cools and shrinks within the recesses 21 and 23 of the steel gear 10. The drawing is out of proportion for illustration purposes, and as illustrated a clearance develops between the spokes 20 and 22 and their corresponding recesses 21 and 23 as the aluminum cools due to the differences in coefficients of thermal expansion of aluminum and steel. However, by providing the spokes in two rows which are axially displaced by one diameter, the spokes 20 and 22 shrink towards each other thereby maintaining slidable intimate contact with the sides of the recesses 21 and 23, respectively, as shown. Thus, thermally compliant (slidable to allow relative diametral movement) interconnections are provided which restrict radial, axial, circumferential or rotational looseness or play between the members. Similar interconnections are provided at each of the engaging portions of the aluminum and steel members as illustrated and described above with reference to FIG. 2.

The invention provides a strong yet lightweight gear and bearing assembly having thermally compliant joints that limit thermally induced distortion caused bearing preload and its resultant high rotational torques. Accurate positioning and movement of electronic apparatus such as a radar antenna is provided since axial, radial, circumferential and rotational play between the parts is minimized, maintained, or eliminated.

While the invention has been described with reference to a specific embodiment the description is illustrative of the invention and is not to be construed as limiting the invention. Various modifications and applications may occur to those skilled in the art without departing from the true spirit and scope of the invention as defined by the appended claims.

What is claimed is:

1. In a wheel-like structure having a plurality of members, a differential expansion/contraction structural interconnection system for two members comprising a first member having a circumferential surface with a plurality of recesses therein extending into said first member, a second member having a circumferential surface adjacent to and in cooperative relationship with said surface of said first member, and a plurality of radial projections extending from said surface of said second member and engaging said plurality of recesses thereby allowing relative concentric expansion or contraction movement between the surfaces of said first member and said second member while limiting radial, axial, circumferential, and rotational movement between the axes of said first member and said second member such that their axes remain coincident.

2. The differential expansion/contraction structural interconnection system as defined by claim 1 wherein said first member and said second member have different coefficients of thermal expansion.

3. The differential expansion/contraction structural interconnection system as defined by claim 1 wherein said first member and said second member are of different materials.

4. The differential expansion/contraction structural interconnection system as defined by claim 1 wherein said first member and said second member are at different temperatures.

5. The interconnection system as defined by claim 1 wherein said recesses are arranged in at least two parallel rows whereby thermal expansion or contraction of said projections relative to one another maintains said projections in engagement with said recesses.

6. In a wheel-like structure having a plurality of members, a differential expansion/contraction structural interconnection system for two members comprising a first member having an outer circumferential surface, a second member having an inner circumferential surface adjacent to and in cooperative relationship with said surface of said first member, one of said members having a plurality of radial recesses and the other member having a plurality of radial projections, said plurality of projections engaging said plurality of recesses thereby allowing relative concentric expansion of contraction movement between the surfaces of said first member and said second member while limiting radial, axial, circumferential, and rotational movement between the axes of said first member and said second member such that their axes remain coincident.

7. The differential expansion/contraction structural interconnection system as defined by claim 6 wherein said first member and said second member having different coefficients of thermal expansion.

8. The differential expansion/contraction structural interconnection system as defined by claim 6 wherein said first member and said second member are of different materials.

9. The differential expansion/contraction structural interconnection system as defined by claim 6 wherein said first member and said second member are at different temperatures.

10. The interconnection system as defined by claim 6 wherein said recesses are arranged in at least two parallel rows whereby thermal expansion or contraction of said projections relative to one another maintains said projections in engagement with said recesses.

* * * * *